US007711876B2

(12) United States Patent
Shotwell et al.

(10) Patent No.: US 7,711,876 B2
(45) Date of Patent: May 4, 2010

(54) DYNAMIC CATEGORY COMPRESSION IN A DATA STORAGE LIBRARY

(75) Inventors: Kerri R Shotwell, Tucson, AZ (US); James A Fisher, Tucson, AZ (US); Erika M Dawson, Tucson, AZ (US); Jonathan W Peake, Tucson, AZ (US); Theresa M Howard, Oro Valley, AZ (US); Gregory T Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 11/087,208

(22) Filed: Mar. 23, 2005

(65) Prior Publication Data

US 2006/0217834 A1 Sep. 28, 2006

(51) Int. Cl.
*G06F 12/00* (2006.01)

(52) U.S. Cl. ......................... 710/68; 711/161; 711/154; 711/111; 711/113; 710/33

(58) Field of Classification Search ................. 700/213, 700/214; 707/1, 104.1, 200, 205, 206, 204; 711/111, 112, 154, 165, 4, 159, 161, 170, 711/202; 360/48, 49
See application file for complete search history.

(56) References Cited

U.S. PATENT DOCUMENTS 4,638,424 A 1/1987 Beglin et al.
4,771,375 A 9/1988 Beglin et al.
5,485,321 A * 1/1996 Leonhardt et al. ............. 360/48
5,537,652 A 7/1996 Friedl et al.
5,574,907 A * 11/1996 Jernigan et al. ................ 707/1
5,632,012 A * 5/1997 Belsan et al. .................. 714/6

(Continued)

FOREIGN PATENT DOCUMENTS

EP 0978837 A1 2/2000

(Continued)

OTHER PUBLICATIONS

Microsoft, Microsoft Computer Dictionary, 2002, Microsoft Press, 5th ed, pp. 151, 171.*

(Continued)

*Primary Examiner*—Henry W. H. Tsai
*Assistant Examiner*—Cheng-Yuan Tseng
(74) *Attorney, Agent, or Firm*—Dan Shifrin

(57) ABSTRACT

Methods and apparatus are provided for dynamically compressing categories in a data storage library. In one embodiment, the method includes retrieving an identification of a first category in the data storage library, the first category being a last-compressed category. Next, an identification number of a first order of the first category is retrieved, the first order being a last compressed order. Compression is resumed of orders in the first category with an order next following the first order and continued with additional orders in the first category. If a predetermined amount of time has elapsed, the identification of the first category and the identification number of the order of the first category being compressed are stored. If, however, the predetermined amount of time has not elapsed and compression of the first category is complete, compression of a second category is begun.

15 Claims, 6 Drawing Sheets

U.S. PATENT DOCUMENTS

| | | | | |
|---|---|---|---|---|
| 5,802,599 | A * | 9/1998 | Cabrera et al. | 711/170 |
| 5,808,821 | A * | 9/1998 | Davy | 360/48 |
| 5,946,278 | A | 8/1999 | Tower | |
| 6,014,675 | A * | 1/2000 | Brewer et al. | 707/204 |
| 6,205,529 | B1 | 3/2001 | Shagam | |
| 6,229,659 | B1 | 5/2001 | Watkins et al. | |
| 6,298,439 | B1 * | 10/2001 | Beglin | 713/1 |
| 6,304,880 | B1 | 10/2001 | Kishi | |
| 6,496,913 | B1 | 12/2002 | Taugher et al. | |
| 6,507,883 | B1 * | 1/2003 | Bello et al. | 711/4 |
| 6,513,101 | B1 * | 1/2003 | Fisher et al. | 711/159 |
| 6,535,790 | B2 * | 3/2003 | Nakano et al. | 700/214 |
| 6,557,073 | B1 | 4/2003 | Fujiwara et al. | |
| 6,718,427 | B1 | 4/2004 | Carlson et al. | |
| 6,785,697 | B2 * | 8/2004 | Haustein | 707/206 |
| 6,816,941 | B1 * | 11/2004 | Carlson et al. | 711/111 |
| 7,249,218 | B2 * | 7/2007 | Gibble et al. | 711/113 |
| 7,308,528 | B2 * | 12/2007 | Kitamura et al. | 711/111 |
| 2004/0044827 | A1 * | 3/2004 | Carlson et al. | 711/4 |
| 2004/0044830 | A1 * | 3/2004 | Gibble et al. | 711/4 |
| 2004/0044858 | A1 * | 3/2004 | Wong et al. | 711/156 |

FOREIGN PATENT DOCUMENTS

| | | |
|---|---|---|
| JP | 2002182952 A | 6/2002 |

OTHER PUBLICATIONS

GULC, Stack Maintenance Unit Student Assistant Job Description, p. 1.*

Kishi, The IBM Virtual Tape Server: Making tape controllers more autonomic, 2003, IBM Journal of Research and Development, vol. 47, No. 4, pp. 459-469.*

University of Michigan, Shelver, 2005, University of Michigan, p. 1.*

IBM (1971) Technical Disclosure Bulletin p3096.

* cited by examiner

| Scratch Category | Private Category |
|---|---|
| 0 | 0 |
| 1 | 1 |
| 2 | 2 |
| 3 | 3 |
| 4 | ⋮ |
| ⋮ | 101 |
| 71 | 102 |
| 72 → Volume F | 103 |
| 73 | |
| 74 | |
| ⋮ | |
| 240 | |
| 241 → Volume G | |
| 242 | |
| 243 | |
| 244 | |
| ⋮ | |

| Scratch Category | Private Category |
|---|---|
| 0 | 0 |
| 1 | 1 |
| 2 | 2 |
| 3 | 3 |
| 4 | ⋮ |
| ⋮ | 101 |
| 71 | 102 |
| 72 | 103 |
| 74 | 104 |
| ⋮ | 105 |
| 240 | |
| 241 | |
| 243 | |
| 244 | |
| ⋮ | |

DYNAMIC CATEGORY COMPRESSION IN A DATA STORAGE LIBRARY

TECHNICAL FIELD

The present invention relates generally to data storage libraries and, in particular, to dynamically compressing category orders of logical volumes.

BACKGROUND ART

Many data processing systems require large amounts of data storage space and are configured in a hierarchical manner. More frequently accessed data is stored in high speed but expensive memory, such as in direct access storage devices (DASD), while less frequently accessed data is stored in slower speed but less expensive memory, such as on tape media in automated storage libraries. One such system is a virtual tape system (VTS) in which logical volumes, sometimes numbering in the hundreds of thousands, are written to tape cartridges. As illustrated in FIG. 1, a logical volume may be stored entirely in a single cartridge (such as logical volume X being stored in cartridge A) or may span two or more cartridges (such as logical volume Y being stored in cartridges A and B). When a volume is added to the library, it is assigned an "order" in a "scratch" category. New orders are appended sequentially to the end of the scratch category. FIGS. 2A and 2B illustrate a new volume F being added to the end of the scratch category as order 73. When data is to be written to a volume, the volume is moved to a "private" category and assigned a new order appended to the end of the private category. FIGS. 3A and 3B illustrate two volumes F and G being added to the end of the private category as orders 104 and 105, respectively.

For any of a variety of reasons, data in a volume may no longer be needed and the volume is moved back from the private category to a scratch category, again being assigned a new order appended to the end of the scratch category.

When a volume is moved from one category to another (from scratch to private or from private to scratch), a vacancy is left in the sequence of orders. In FIGS. 3A and 3B, vacancies are left in the scratch category between orders 72 and 74 and between orders 241 and 243 when volumes F and G are moved to the private category. The vacated orders in a category are never reassigned and consequently the orders in the categories may quickly fragment. When the number of volumes in a VTS is in the hundreds of thousands, the number of orders may reach the millions on a busy system. The large number of vacant orders may significantly compromise performance of the database.

SUMMARY OF THE INVENTION

The present invention provides methods, apparatus, computer program products and methods for deploying computing infrastructure for dynamically compressing categories in a data storage library. In one embodiment, the method includes retrieving an identification of a first category in the data storage library, the first category being a last-compressed category. Next, an identification number of a first order of the first category is retrieved, the first order being a last compressed order. Compression is resumed of orders in the first category with an order next following the first order and continued with additional orders in the first category. If a predetermined amount of time has elapsed, the identification of the first category and the identification number of the order of the first category being compressed are stored. If, however, the predetermined amount of time has not elapsed and compression of the first category is complete, compression of a second category is begun. Preferably, compression of a category will not occur and compression of the next category begun if the category is in use, is reserved or has an insufficient number of order vacancies.

In another embodiment, the apparatus includes a manager in a data storage library. The manager includes a database of logical volume categories, a processor; and a memory storing program instructions executable in the processor. Each category is capable of containing a plurality of sequentially appended orders. The executable instructions are operable for retrieving from the database an identification of a first category, the first category being a last-compressed category; retrieving from the database an identification number of a first order of the first category, the first order of the first category being a last compressed order; resuming compression of orders in the first category with an order next following the first order; and, continuing compression of orders in the first category. If a predetermined amount of time has elapsed, the identification of the first category and the identification number of the order of the first category being compressed are stored in the database. If, however, the predetermined amount of time has not elapsed and compression of the first category is complete, compression of a second category is begun.

Other features and advantages of the present invention should be apparent from the following description of the preferred embodiments, which illustrates, by way of example, the principles of the invention.

DETAILED DESCRIPTION OF THE PREFERRED EMBODIMENT

Figure 1:
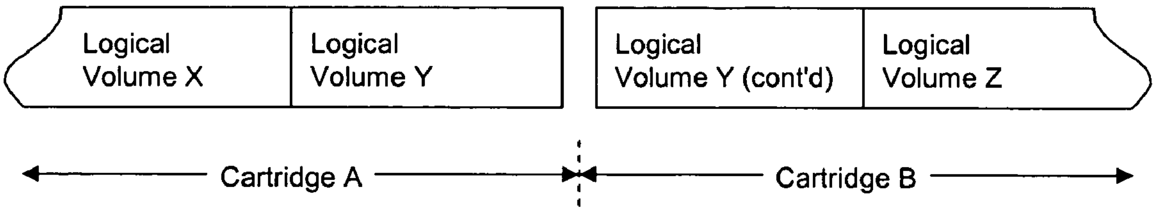
FIG. 1 illustrates an exemplary arrangement of logical volumes written to two data cartridges.
Figure 2A:
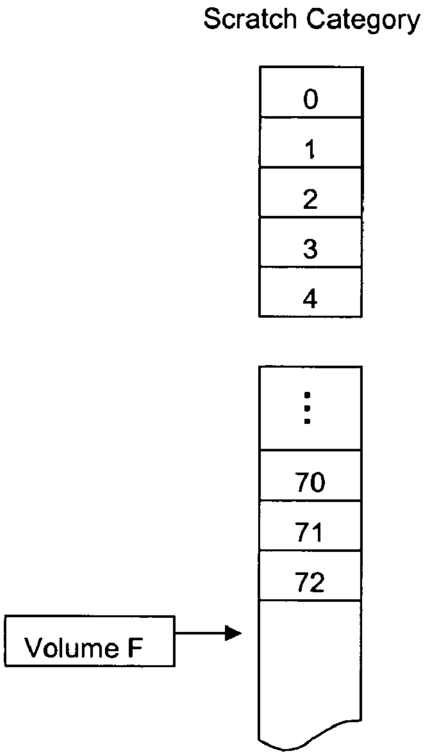
FIGS. 2A and 2B illustrate the appending of a new volume to a scratch category and the assignment of a new order to the volume.
Figure 2B:
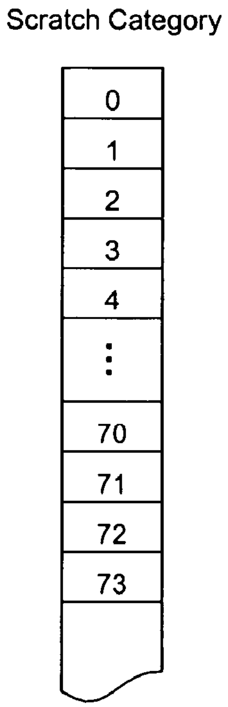
Figure 3A:
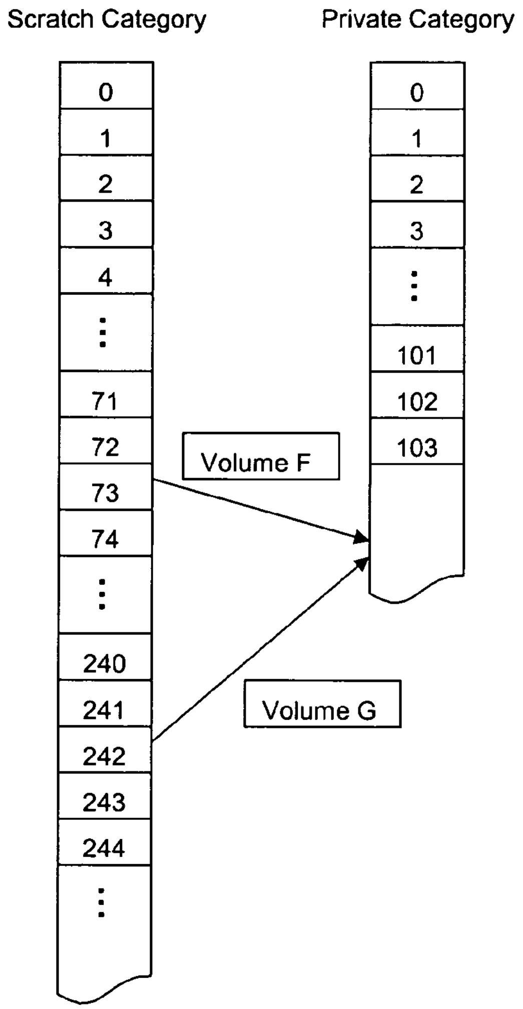
FIGS. 3A and 3B illustrate the movement of two volumes from a scratch category to a private category and the assignment of new orders to the volumes.
Figure 3B:
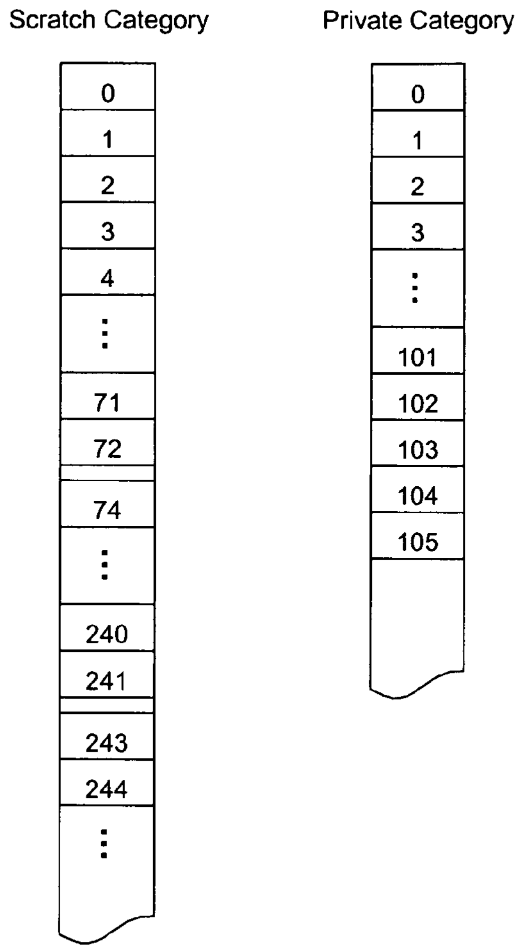
Figure 4:
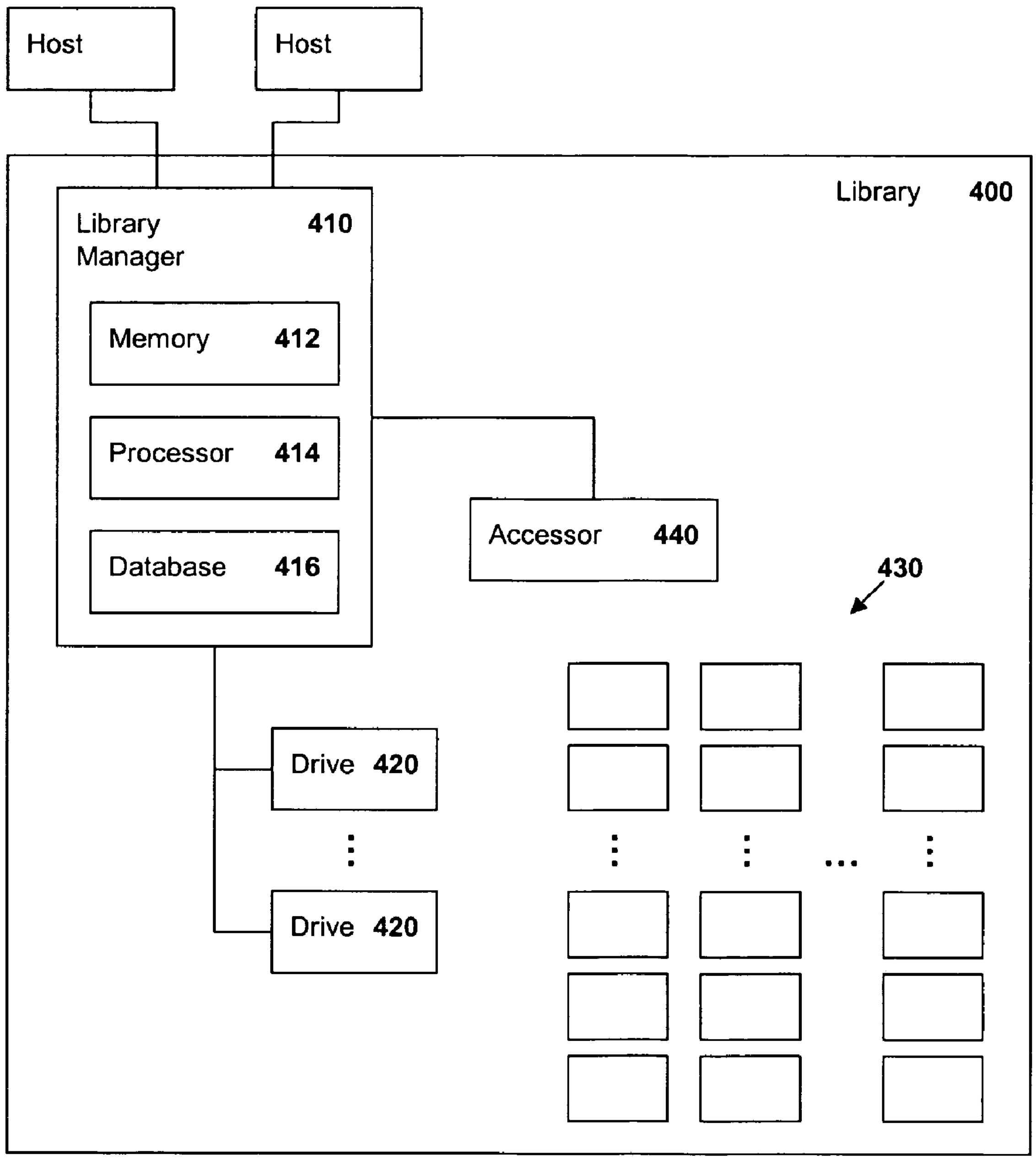
FIG. 4 is a block diagram of an exemplary data storage library in which the present invention may be incorporated.

FIG. 4 is a block diagram of an exemplary data storage library 400 in which the present invention may be incorporated. The library 400 includes a library manager or controller 410, one or more data storage drives 420 operatively coupled to the manager 410, shelves or the equivalent in which storage cartridges 430 are retained and an electromechanical accessor 440 also operatively coupled to the manager 410 and which, under the direction of the manager 410, transports selected cartridges 430 between the storage shelves and the drives 420. The library manager 410 includes a memory 412 for storing programming instructions, a processor 414 for executing the instructions and a database accessible to the processor 414. As used herein, the term "operatively coupled" may refer to an indirect or functional relationship of two components, devices or subsystems as well as to a direct electrical connection between the two.

Figure 5A:
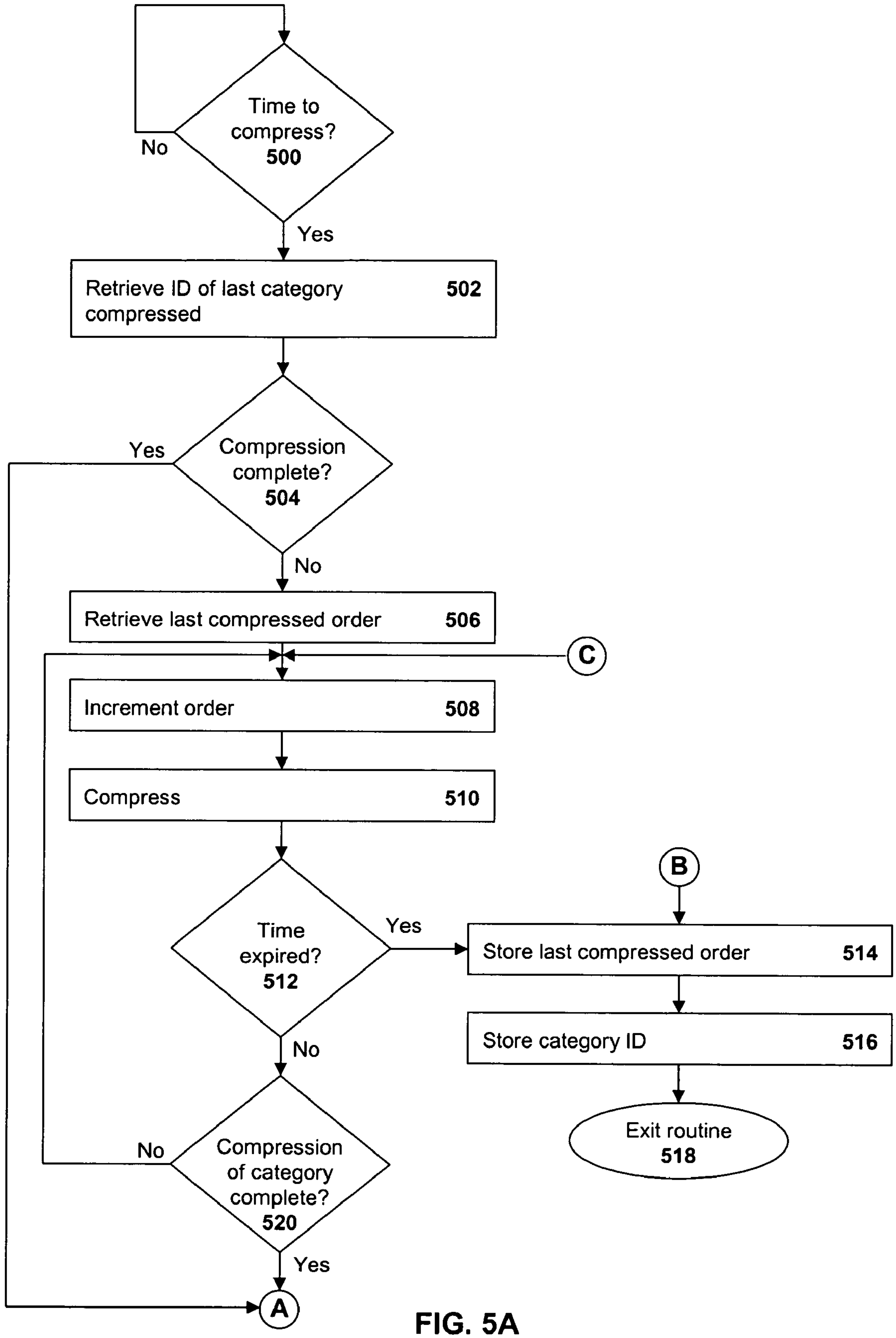
FIGS. 5A and 5B are a flowchart of a method of the present invention.
Figure 5B:
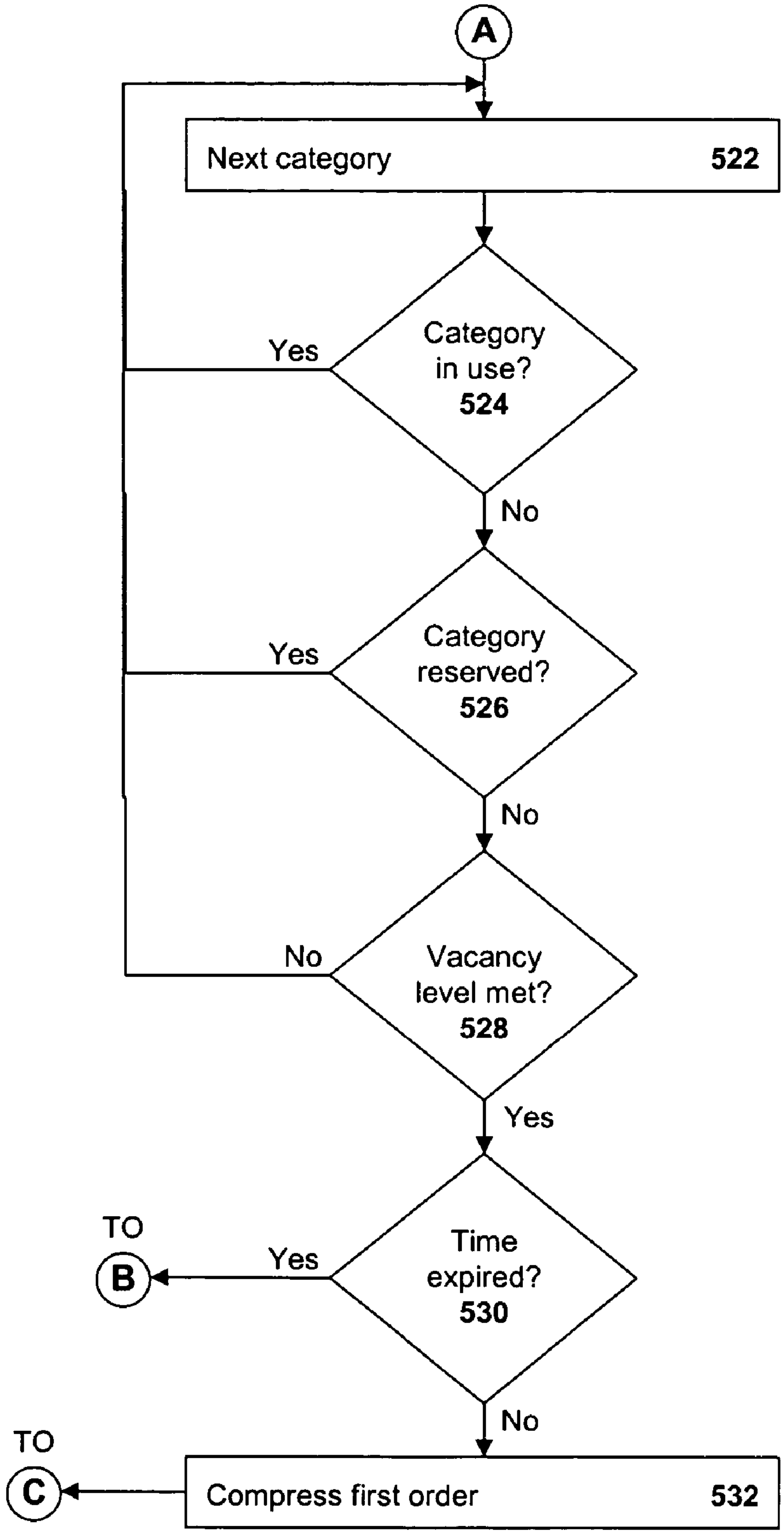

Referring now to the flowchart of FIGS. 5A and 5B, the operation of the compression function of the present invention under the direction of the library manager 410 will be described. Preferably, the compression function will operate in the background and be scheduled to commence periodically at predetermined times. For example, the compression function may be scheduled to commence at 15 minutes past each hour and again at 45 minutes past each hour in order to avoid other functions which are scheduled to run on the hour or on the half hour. Consequently, a check is made to determine if the predetermined time has been reached (step 500). If so, the processor 414 retrieves from the memory 412 or database 416 the identification of the last category compressed (step 502) and the state of that compression. If compression of the last category was not complete, the processor 410 retrieves the last compressed order in the last compressed category (step 506). The order is then incremented to the next order (step 508) and compression begins (step 510). A check is periodically made to determine if the time window for performing the compression operation has expired (step 512) even if the category is not completely compressed. If the time has expired, the identification of the last compressed order is stored (step 514) as is the identification of the category being compressed (step 516) and the compression routine is exited (step 518), allowing the library manager 410 to perform other tasks.

If the time has not expired (step 512), another determination is made as to whether the category is completely compressed (step 520). If so (or if such the determination made in step 504 was affirmative), the procedure increments to the next category (step 522). Checks are made to determine whether the new category is in use (step 524), is reserved (step 526) or has an insufficient number of vacancies (step 528). Reserved categories may include volumes on diagnostic cartridges, clean cartridges or any other user-defined category. When the number of vacancies in a category is not sufficiently large such as about 20% to about 40% and preferably about 30% of the total number of orders in the category, it may not be worth spending computing resources to compress the category. If any of these conditions are met, the procedure again increments to the next category (step 522) and the checks repeated. If the category is not in use, not reserved and sufficiently fragmented, another time check is made (step 530). If time has expired, the last compressed order and the category ID are stored (steps 514 and 516) and the routine exits (step 518). Otherwise, the first order of the category is compressed (step 532), the order is incremented (step 508) and the process continues as described.

Figure 6A:
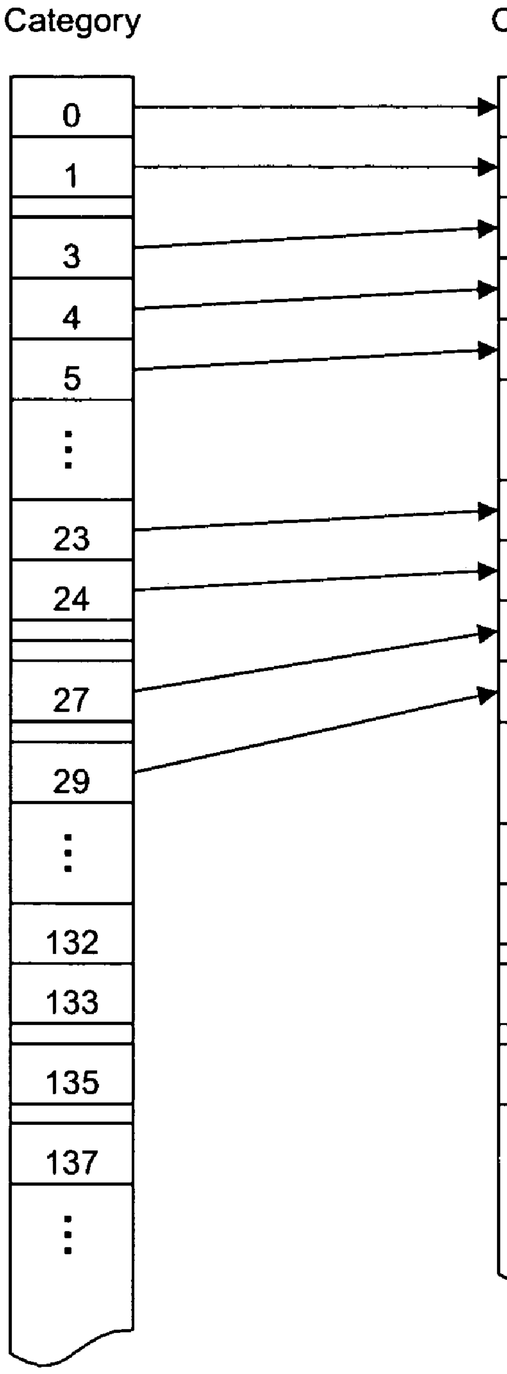
FIGS. 6A, 6B and 6C illustrate the movement of orders within a category during a compression operation of the present invention.
Figure 6B:
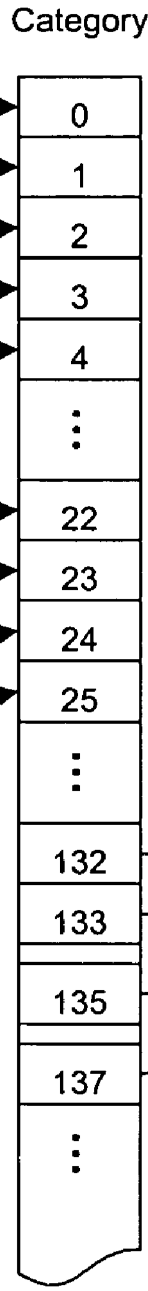
Figure 6C:
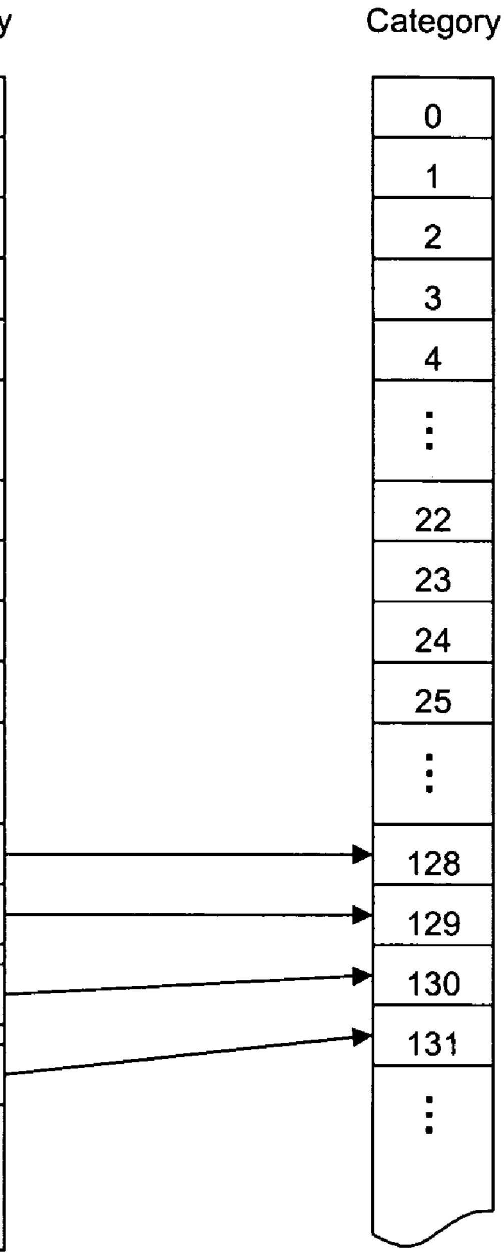

FIGS. 6A, 6B and 6C illustrate the manner in which a category is compressed. As indicated in FIG. 6*a*, there are vacancies in the category where orders 2, 25, 26, 28, 134 and 136 have been removed. During compression, the first vacancy is filled with the next non-vacant order. Thus, in FIG. 6B, the vacancy between orders 1 and 3 is filled with order 3, now reassigned as order 2. Order 4 is moved to the new vacancy created when order 3 was moved, and so forth. If the time period for compression expires before compression of the order is complete, compression is halted and pertinent information is stored. In FIG. 6B, compression was halted before order 132 could be moved. When compression is resumed, it begins with the order after the last order compressed. Thus, order 132 will be moved to the vacancy of order 128 in FIG. 6C and the remaining orders will be likewise compressed.

It is important to note that while the present invention has been described in The context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically moving orders within a category of logical volumes stored in a data storage library, comprising:

a) retrieving an identification of a first category of a plurality of categories of logical volumes stored in the data storage library, the first category including a first plurality of orders in sequential locations, each order indicative of a location in the first category to which a logical volume is assignable;

b) determining if the first category includes at least one vacant order to which a logical volume is not assigned and if a number of vacant orders in the first category is greater than a predetermined vacancy level;

c) if the number of vacant orders in the first category is greater than the predetermined vacancy level, retrieving an identification number of a first vacant order in the first category;

d) retrieving an identification number of a first non-vacant order to which a first logical volume is assigned of the first category following the first vacant order;

e) moving the identified first non-vacant order to the first vacant order whereby the first vacant order is indicative of the location in the first category to which the first logical volume is assigned;

f) if a predetermined amount of time has elapsed, storing the identification of the first category and the identification number of the first vacant order of the first category, whereby moving the orders in the first category is resumed at a later time;

g) if the predetermined amount of time has not elapsed, repeating steps b)-f); and h) if at step c) the first category does not include at least one vacant order or the number of vacant orders in the first category is not greater than a predetermined vacancy level, retrieving an identification of a second category of the plurality of categories in the data storage library, the second category including a second plurality of orders in sequential locations, and repeating steps b)-g) for the orders in the second category.

2. A manager in a data storage library, comprising:

a database of logical volume categories, each category capable of containing a plurality of sequentially appended orders;

a processor; and memory storing program instructions executable in the processor and operable for:

a) retrieving an identification of a first category of a plurality of categories of logical volumes stored in the data storage library, the first category including a first plurality of orders in sequential locations, each order indicative of a location in the first category to which a logical volume is assignable;

b) determining if the first category includes at least one vacant order to which a logical volume is not assigned and if a number of vacant orders in the first category is greater than a predetermined vacancy level;

c) if the number of vacant orders in the first category is greater than the predetermined vacancy level, retrieving an identification number of a first vacant order in the first category;

d) retrieving an identification number of a first non-vacant order to which a logical volume is assigned of the first category following the first vacant order;

e) moving the identified first non-vacant order to the first vacant order whereby the first vacant order is indicative of the location in the first category to which the first logical volume is assigned;

f) if a predetermined amount of time has elapsed, storing the identification of the first category and the identification number of the first vacant order of the first category, whereby moving the orders in the first category is resumed at a later time;

g) if the predetermined amount of time has not elapsed, repeating steps b)-f); and h) if at step c) the first category does not include at least one vacant order or the number of vacant orders in the first category is not greater than a predetermined vacancy level, retrieving an identification of a second category of the plurality of categories in the data storage library, the second category including a second plurality of orders in sequential locations, and repeating steps b)-g) for the orders in the second category.

3. A data storage library attached to a host device, the library comprising:

a plurality of removable data cartridges;

a data drive for reading and writing logical volumes from and to a data cartridge loaded therein;

an accessor for transporting data cartridges between storage slots and the data drive;

a database storing a plurality of volume categories to which the volumes are assigned, each volume being associated with a sequentially designated order entry appended to an end of the category to which the volume is assigned; and a library manager operatively coupled to the data drive, the accessor and an external host device, the library manager comprising a memory operable for:

a) retrieving an identification of a first category of a plurality of categories of logical volumes stored in the data storage library, the first category including a first plurality of orders in sequential locations, each order indicative of a location in the first category to which a logical volume is assignable;

b) determining if the first category includes at least one vacant order to which a logical volume is not assigned and if a number of vacant orders in the first category is greater than a predetermined vacancy level;

c) if the number of vacant orders in the first category is greater than the predetermined vacancy level, retrieving an identification number of a first vacant order in the first category;

d) retrieving an identification number of a first non-vacant order to which a logical volume is assigned of the first category following the first vacant order;

e) moving the identified first non-vacant order to the first vacant order whereby the first vacant order is indicative of the location in the first category to which the first logical volume is assigned;

f) if a predetermined amount of time has elapsed, storing the identification of the first category and the identification number of the first vacant order of the first category, whereby moving the orders in the first category is resumed at a later time;

g) if the predetermined amount of time has not elapsed, repeating steps b)-f); and h) if at step c) the first category does not include at least one vacant order or the number of vacant orders in the first category is not greater than a predetermined vacancy level, retrieving an identification of a second category of the plurality of categories in the data storage library, the second category including a second plurality of orders in sequential locations, and repeating steps b)-g) for the orders in the second category.

4. A computer program product of a computer readable storage medium usable with a programmable computer, the computer program product having computer-readable code embodied therein for dynamically moving orders within a category of logical volumes stored in a data storage library, the computer-readable code comprising instructions for:

a) retrieving an identification of a first category of a plurality of categories of logical volumes stored in the data storage library, the first category including a plurality of orders in sequential locations, each order indicative of a location in the first category to which a logical volume is assignable;

b) determining if the first category includes at least one vacant order to which a logical volume is not assigned and if a number of vacant orders in the first category is greater than a predetermined vacancy level;

c) if the number of vacant orders in the first category is greater than the predetermined vacancy level, retrieving an identification number of a first vacant order in the first category;

d) retrieving an identification number of a first non-vacant order to which a logical volume is assigned of the first category following the first vacant order;

e) moving the identified first non-vacant order to the first vacant order whereby the first vacant order is indicative of the location in the first category to which the first logical volume is assigned;

f) if a predetermined amount of time has elapsed, storing the identification of the first category and the identification number of the first vacant order of the first category, whereby moving the orders in the first category is resumed at a later time;

g) if the predetermined amount of time has not elapsed, repeating steps b)-f); and h) if at step c) the first category does not include at least one vacant order or the number of vacant orders in the first category is not greater than a predetermined vacancy level, retrieving an identification of a second category of the plurality of categories in the data storage library, the second category including a second plurality of orders in sequential locations, and repeating steps b)-g) for the orders in the second category.

5. A method for deploying computing infrastructure, comprising integrating computer readable code into a computing system, wherein the code, in combination with the computing system, is capable of performing the following:

a) retrieving an identification of a first category of a plurality of categories of logical volumes stored in the data storage library, the first category including a first plurality of orders in sequential locations, each order indicative of a location in the first category to which a logical volume is assignable;

b) determining if the first category includes at least one vacant order to which a logical volume is not assigned and if a number of vacant orders in the first category is greater than a predetermined vacancy level;

c) if the number of vacant orders in the first category is greater than the predetermined vacancy level, retrieving an identification number of a first vacant order in the first category;

d) retrieving an identification number of a first non-vacant order to which a logical volume is assigned of the first category following the first vacant order;

e) moving the identified first non-vacant order to the first vacant order whereby the first vacant order is indicative of the location in the first category to which the first logical volume is assigned;

f) if a predetermined amount of time has elapsed, storing the identification of the first category and the identification number of the first vacant order of the first category, whereby moving the orders in the first category is resumed at a later time;

g) if the predetermined amount of time has not elapsed, repeating steps b)-f); and h) if at step c) the first category does not include at least one vacant order or the number of vacant orders in the first category is not greater than a predetermined vacancy level, retrieving an identification of a second category of the plurality of categories in the data storage library, the second category including a second plurality of orders in sequential locations, and repeating steps b)-g) for the orders in the second category.

6. The method of claim 1, further comprising retrieving an identification of the second category of the plurality of categories in the data storage library and repeating steps b)-g) for orders in the second category if the first category is in use.

7. The method of claim 1, further comprising retrieving an identification of the second category of the plurality of categories in the data storage library and repeating steps b)-g) for orders in the second category if the first category is a reserved category.

8. The manager of claim 2, wherein the instructions further comprise instructions for retrieving an identification of the second category of the plurality of categories in the data storage library and repeating steps b)-g) for orders in the second category if the first category is in use.

9. The manager of claim 2, wherein the instructions further comprise instructions for retrieving an identification of the second category of the plurality of categories in the data storage library and repeating steps b)-g) for orders in the second category if the first category is a reserved category.

10. The library of claim 3, further comprising retrieving an identification of the second category of the plurality of categories in the data storage library and repeating steps b)-g) for orders in the second category if the first category is in use.

11. The library of claim 3, further comprising retrieving an identification of the second category of the plurality of categories in the data storage library and repeating steps b)-g) for orders in the second category if the first category is a reserved category.

12. The program product of claim 4 wherein the instructions further comprise instructions for retrieving an identification of the second category of the plurality of categories in the data storage library and repeating steps b)-g) for orders in the second category if the first category is in use.

13. The program product of claim 4, wherein the instructions further comprise instructions for retrieving an identification of the second category of the plurality of categories in the data storage library and repeating steps b)-g) for orders in the second category if the first category is a reserved category.

14. The method of claim 5, further comprising retrieving an identification of the second category of the plurality of categories in the data storage library and repeating steps b)-g) for orders in the second category if the first category is in use.

15. The method of claim 5, further comprising retrieving an identification of the second category of the plurality of categories in the data storage library and repeating steps b)-g) for orders in the second category if the first category is a reserved category.

* * * * *